(12) United States Patent
Kaneko et al.

(10) Patent No.: US 12,547,912 B2
(45) Date of Patent: Feb. 10, 2026

(54) DEVICE OF PREDICTING, MEDIUM OF PREDICTING, AND METHOD OF PREDICTING PRODUCTION INDEX USING MOVING OBJECT STAY NUMBER

(71) Applicants: TOYOTA JIDOSHA KABUSHIKI KAISHA, Toyota (JP); Takuya Kaneko, Sakura (JP)

(72) Inventors: Takuya Kaneko, Sakura (JP); Yutaro Mishima, Fujimino (JP); Shinya Wada, Fujimino (JP); Rui Kimura, Shinjuku (JP); Ryota Osumi, Nagoya (JP); Noriaki Saitoh, Nagoya (JP)

(73) Assignees: TOYOTA JIDOSHA KABUSHIKI KAISHA, Toyota (JP); Takuya Kaneko, Sakura (JP)

( * ) Notice: Subject to any disclaimer, the term of this patent is extended or adjusted under 35 U.S.C. 154(b) by 1023 days.

(21) Appl. No.: 17/652,560

(22) Filed: Feb. 25, 2022

(65) Prior Publication Data
US 2022/0284325 A1 Sep. 8, 2022

(30) Foreign Application Priority Data
Mar. 3, 2021 (JP) .................................. 2021-033972

(51) Int. Cl.
*G06N 5/04* (2023.01)
*G06N 5/022* (2023.01)
*G06Q 30/0201* (2023.01)

(52) U.S. Cl.
CPC ............... *G06N 5/04* (2013.01); *G06N 5/022* (2013.01); *G06Q 30/0206* (2013.01)

(58) Field of Classification Search
CPC ...... G06N 5/04; G06N 20/00; G06Q 30/0202; G06Q 30/0206; G06Q 10/04; G06Q 40/04;
(Continued)

(56) References Cited

U.S. PATENT DOCUMENTS 9,747,642 B1 * 8/2017 Counihan ............... G06T 13/60
10,467,473 B1 * 11/2019 Adler ..................... G06N 3/045
(Continued)

FOREIGN PATENT DOCUMENTS

KR 20210063772 A * 6/2021 ............ G06Q 40/04
WO 2012036222 A1 3/2012

OTHER PUBLICATIONS

W. Wen et al., "A low risk stock trading decision support system," 2011 IEEE International Summer Conference of Asia Pacific Business Innovation, Dalian, China, 2011, pp. 117-121, <https://ieeexplore.ieee.org/document/5996305?source=IQplus> (Year: 2011).*
(Continued)

*Primary Examiner* — Jerry O'Connor
*Assistant Examiner* — Michael R Koester
(74) *Attorney, Agent, or Firm* — Dickinson Wright, PLLC (57) ABSTRACT

A prediction device includes one or more processors configured to record a number of moving objects staying in a predetermined production area for every predetermined period, record an actual production index for each predetermined period, estimate a correlation coefficient by using training data that associates the number of moving objects staying in the predetermined production area with the actual production index for the predetermined period, and calculate a predicted production index for a target period based on a number of moving objects staying for the target period, using the correlation coefficient.

7 Claims, 6 Drawing Sheets

(58) Field of Classification Search
CPC ........ G06Q 40/06; G06Q 10/06; G06Q 40/02; G06Q 10/087; G06F 16/2228
See application file for complete search history.

(56) References Cited

U.S. PATENT DOCUMENTS

| | | | |
|---|---|---|---|
| 11,599,892 B1* | 3/2023 | Guzman | G06Q 40/06 |
| 2013/0090891 A1 | 4/2013 | Kobayashi et al. | |
| 2016/0171059 A1* | 6/2016 | Diamond | G06F 16/248 707/722 |
| 2021/0264225 A1* | 8/2021 | McCarson | G06F 18/29 |

OTHER PUBLICATIONS

"How indices of industrial production work and how to read them", URL:https://www.meti.go.jp/statistics/toppage/reportminikaisetsu/pdf/iip_nyuumon.pdf.

* cited by examiner

```
Nk: TOTAL NUMBER OF USERS (SMARTPHONE) OF GROUP k
Nt: TOTAL NUMBER OF USERS (VEHICLE) OF GROUP t
position(i,t): POSITION INFORMATION OF USER i IN PERIOD t
Na: TOTAL NUMBER OF INDUSTRIAL ZONE AREAS
area(i): i-TH AREA OF CONFIRMATION TARGET
count(i): TOTAL NUMBER OF PEOPLE OF i-TH DAY
index(m): PRODUCTION INDEX OF m-TH MONTH count(d) = 0
for i = 1 to Nk + Nt
    for t = d0 to d24 (0 HOUR TO 24 HOUR OF d DAY)
        for j = 0 to Na
            if position(i,t) ∩ area ≠ Φ then (ADD WHEN IT IS IN AREA)
                count(d) = count(d) + 1
            endif
        next j
    next t
next i index(m) = 0
for d = 1 to N
    index(m) = index(m) + count(d)
next d
```

DEVICE OF PREDICTING, MEDIUM OF PREDICTING, AND METHOD OF PREDICTING PRODUCTION INDEX USING MOVING OBJECT STAY NUMBER

CROSS-REFERENCE TO RELATED APPLICATION

This application claims priority to Japanese Patent Application No. 2021-033972 filed on Mar. 3, 2021, incorporated herein by reference in its entirety.

BACKGROUND

1. Technical Field

The disclosure relates to technology that predicts a production index, which is an economic indicator, and to a device, a medium, and a method that predict a production index using a moving object stay number.

2. Description of Related Art

Many investors adjust their portfolios (a combination of investment content) according to fluctuations in the numerical values of economic indicators. The investors, of course, make adjustments when economic indicators of the government publication are published, and repeat fine adjustments with respect to a prediction value of the economic indicators that are predicted daily by analysts.

For example, many investors pay attention to the monthly government-published production index and the quarterly government-published gross domestic product (GDP) value. These are very relevant economic indicators for understanding the domestic economic situation. For example, analysts belonging to securities companies can be broadly divided into two types: microeconomists and macroeconomists. The microeconomists specialize in analyzing companies that belong to each industry. On the other hand, the macroeconomists specialize in analyzing the overall economic status in domestic and overseas economies and predict macro indicators, such as GDP. Financial information vendors compile economic indicators predicted by a plurality of macroeconomists, and an average value (or weighted average based on a correct answer rate) of the predicted economic indicators is the "market consensus."

The "production index" that the investors use to adjust their portfolios is not published by the government one after another. Therefore, the investors repeat fine adjustments to adapt their portfolios based on ever-changing market consensus. Through the fine adjustment, economic indicators published at a future point in time are automatically incorporated into the market price.

Although the production index of the government publication itself changes significantly, when it is a numerical value close to the market consensus, it is as already predicted and adjustment for the change is finished. In this regard, it determines that "the market has already factored in changes". On the other hand, when the production index deviates significantly from the market consensus immediately after the government publication publishes the production index, the investors try to adjust to the correct numerical value of the government publication. At the time, since many investors adjust their positions at the same time, securities prices of financial products to be adjusted fluctuate significantly. This is called a "market surprise". The "market surprise" literally means "surprise". Since many investors are surprised and suddenly reorganize their portfolios in the same way, the securities prices of financial products significantly fluctuate.

SUMMARY

As mentioned above, when the production index deviates from the market consensus immediately after the government publishes the production index, the market surprise occurs. Originally, the market surprises are a big profit opportunity for the investors because the securities prices of financial products significantly fluctuate. However, above-mentioned fact cannot be foreseen.

On the other hand, the inventors of the present application considered whether it would be possible to predict the production index in advance using data other than the market consensus. As a result, it is considered that the potential for market surprise occurrence can be predicted.

Aspects of the present disclosure provide a prediction device, a medium, and a method capable of predicting a production index using data other than the market consensus.

A first aspect of the disclosure relates to a prediction device that predicts a production index. The prediction device includes one or more processors configured to record a number of moving objects staying in a predetermined production area for every predetermined period, record an actual production index for each predetermined period, estimate a correlation coefficient by using training data that associates the number of moving objects staying in the predetermined production area with the actual production index for the predetermined period, and calculate a predicted production index for a target period based on a number of moving objects staying for the target period, using the correlation coefficient.

In the above aspect, the production index may be a mining and industrial production index, and the predetermined production area may be a mining and industrial zone area.

In the above aspect, a position information database configured to collect and store position information of the moving objects via a wireless network from a positioning unit mounted on at least one of a mobile terminal possessed by an individual or a communication terminal installed in a vehicle may further be included, and the one or more processors may be configured to calculate the number of moving objects based on the position information of the moving objects stored in the position information database.

In the above aspect, the one or more processors may be configured to estimate the correlation coefficient based on linear regression.

In the above aspect, the one or more processors may further be configured to compare the predicted production index predicted for the target period with a forecast production index market-forecasted for the target period, and the one or more processors may be configured to predict a rising fluctuation of the forecast production index when the predicted production index is larger than the forecast production index by a first value which is more than an upper threshold value and to predict a falling fluctuation of the forecast production index when the forecast production index is larger than the predicted production index by a second value which is more than a lower threshold value.

In the above aspect, it may be configured to determine the upper threshold value and the lower threshold value, and the one or more processors may be configured to calculate a first variance based on an error between the actual production index and the predicted production index for the target period, $V1=1/(n-1)\cdot\Sigma(P(t)-A(t))^2$ where V1 is the first variance, A(t) is the actual production index, and P(t) is the predicted production index, to calculate a second variance based on an error between the actual production index and the forecast production index for the target period, $V2=1/(n-1)\cdot\Sigma(C(t)-A(t))^2$ where V2 is the second variance, C(t) is the forecast production index, and A(t) is the actual production index, and to determine the upper threshold value and the lower threshold value based on a square root ($\sqrt{(V1+V2)}$) in a sum of the first variance and the second variance.

In the above aspect, it may be configured to determine the upper threshold value and the lower threshold value as the same value as follows.

$$U(t)=D(t)=\sigma\times\sqrt{(V1+V2)}$$

where σ: coefficient (1.96 when the coefficient is based on error normal distribution), U(t) is the upper threshold value, and D(t) is the lower threshold value.

In the above aspect, it may be further configured to record a securities price of a financial product for every predetermined period, configured to estimate a regression function by using training data that associates the actual production index for the predetermined period with the securities price for the predetermined period, $S(i, t)=fi(A(t))+\varepsilon$ where S(i, t) is the securities price, fi is the regression function, A(t) is the actual production index, and ε is an error, configured to calculate a predicted securities price for a target period from a predicted production index for the target period using the regression function, $SS=fi(P(t))$ where SS is the predicted securities price, fi is the regression function, and P(t) is the predicted production index, and configured to instruct a difference between the predicted securities price and an actual securities price as an adjustment for a rise or a fall in the actual securities price, and the one or more processors may be configured to predict that a securities price rises when the predicted securities price is larger than the securities price based on the actual production index by a first predetermined threshold value or more and predict that a securities price falls when the predicted securities price is smaller than the securities price based on the actual production index by a second predetermined threshold value or more.

A second aspect of the disclosure relates to a non-transitory storage medium storing instructions that cause a computer installed in a device that predicts a production index to perform functions. The medium records a number of moving objects staying in a predetermined production area for every predetermined period, records an actual production index for each predetermined period, estimate a correlation coefficient by using training data that associates the number of moving objects staying in the predetermined production area with the actual production index for the predetermined period, and calculates a predicted production index for a target period based on a number of moving objects staying for the target period, using the correlation coefficient.

A third aspect of the disclosure relates to a method of predicting a production index of a device. In the method, the device is configured to record a number of moving objects staying in a predetermined production area for every predetermined period and record an actual production index for each predetermined period. The method comprises estimating a correlation coefficient by using training data that associates the number of moving objects staying in the predetermined production area with the actual production index for the predetermined period, and calculating a predicted production index for a target period based on a number of moving objects staying for the target period, using the correlation coefficient.

According to the disclosure, the production index can be predicted by using the number of moving objects staying in the predetermined production area. As a result, the potential for market surprise occurrence can also be predicted.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinafter, embodiments will be described in detail with reference to the drawings.

A "production index" described in the embodiment is, for example, a "mining and industrial production index", and the production area described in the embodiment is assumed to be a "mining and industrial zone area". The mining and industrial production index is an economic indicator that comprehensively represent the production status of a mining and manufacturing industry inside Japan (for example, refer to "Mechanism and view of the mining and industrial index", [online], [Searched on Feb. 17, 2021], Internet <URL:https://www.meti.go.jp/statistics/toppage/report/minikaisetsu/pdf/iip_nyuumon.pdf>). The economic indicator is an adopted series of a business conditions indexes because it has a high coverage rate of production in the whole country and has a high quick reports characteristic. Of course, according to the disclosure, the production index is not limited to the mining and industrial production index, and can be applied to various production indexes, such as a factory shipment index, an inventory index, an operating rate index, and a production capacity index. In particular, it is suitable as an index based on the amount of added value.

Figure 1:
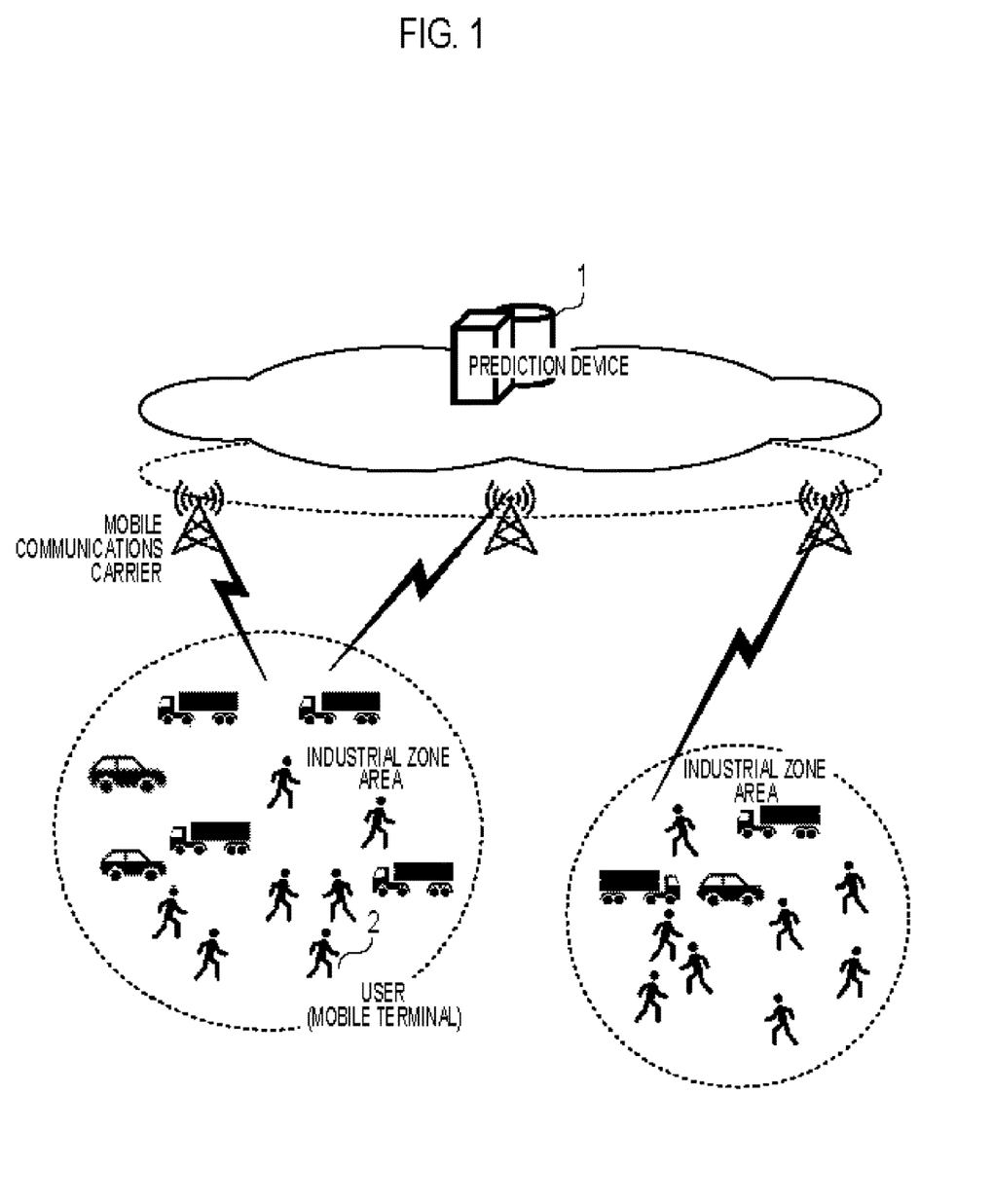
FIG. 1 is a system configuration diagram.

FIG. 1 is a system configuration diagram in the disclosure.

According to FIG. 1, in an industrial zone area, an unspecified number of people and vehicles (moving objects) are flowing in real time. The range of the industrial zone area may be in units of prefectures, cities, towns, and villages of an address, or may be within a predetermined radius from a position of an industrial center. A relevant point about the disclosure is how long people and the vehicles are staying in the industrial zone area and how much they are flowing.

According to FIG. 1, each of users and the vehicles possesses a mobile terminal 2 and is constantly communicating with a mobile communications carrier equipment. Therefore, the mobile communications carrier stores the time and position in association with each identification data (ID) (for example, subscriber ID) of the user or the vehicle possessing the mobile terminal 2.

The user's position is, for example, as follows.
(1) Latitude and longitude information positioned by the mobile terminal 2 itself by global positioning system (GPS) is a terminal positioning position positioned by the mobile terminal 2 possessed by the user.
(2) A position of the mobile terminal 2 estimated from the position information of the base station or the access point having the mobile terminal 2 under control may be a base station positioning position of a mobile terminal connected to a base station or an access point of a communications carrier. However, the position information has a coarse spatial particle size. The position information may be expressed by the latitude and longitude or map coordinates, or may be one converted into an address name or a map mesh number.

Here, it is relevant that the moving object stay number in the industrial zone area may be the captured users by a communications carrier equipment of a specific communications carrier and may not be all the actual users. That is, the captured people number captured by the specific communications carrier can merely be counted as smaller number than the actual stay people number in the area. That is, it is not possible to collect the position information of all users from all communications carriers. According to the disclosure, it is not obligatory to specify the absolute moving object stay number in the industrial zone area. According to the disclosure described later, it may be acceptable as long as the correlation with the "production index" with respect to the "moving object stay number" in the industrial zone area can be determined.

The disclosure predicts the "production index" using the "moving object stay number". Here, the reason for using the position information of the moving object as the prediction of the economic indicator (specifically, the prediction of the mining and industrial production index) will be described in detail. As a matter of course, the position information of the moving object represents the existence of a person or a vehicle at that time point. For example, the natural assumption is made that there is no big difference in the income of workers (field workers) engaged in the mining and manufacturing industry. At that time, the moving object stay number in the industrial zone area has a strong correlation indirectly with the total added value of the products produced from the industrial zone area. That is, an industry with high added value provides a place to work for many workers, and an industry without added value provides merely the worker number according to the added value. Conversely, the industry that requires a lot of labor means having a high added value.

For example, it is assumed that the position information is captured in the industrial zone areas A and B in the previous time intervals t to t+T as follows.

Industrial zone area A: position information of 30,000 people

Industrial zone area B: position information of 300,000 people

In this case, the added value of the product produced in the industrial zone area B is estimated to be 10 times the added value of the industrial zone area A.

Additionally, it is assumed that the position information is captured in the industrial zone areas A and B in the later time intervals s to s+T as follows.

Industrial zone area A: position information of 10,000 people

Industrial zone area B: position information of 20,000 people

In this case, it can be estimated that the added value generated from the products produced in the industrial zone areas A and B is decreasing. In particular, it is estimated that the added value of the product produced in the industrial zone area B is significantly lowered as compared with the added value of the product produced in the industrial zone area A.

The mining and industrial production index is simply a value obtained such that the government estimates an added value of each of the industrial products and weights and averages the production volume based on the added value (for example, "Mechanism and view of the mining and industrial index", [online], [Searched on Feb. 17, 2021], Internet <URL:https://www.meti.go.jp/statistics/toppage/report/minikaisetsu/pdf/iip_nyuumon.pdt>). Therefore, it is natural that the total moving object stay number in the industrial zone area has a strong correlation with the mining and industrial production index, and it is actually confirmed from the results of data analysis.

Figure 2:
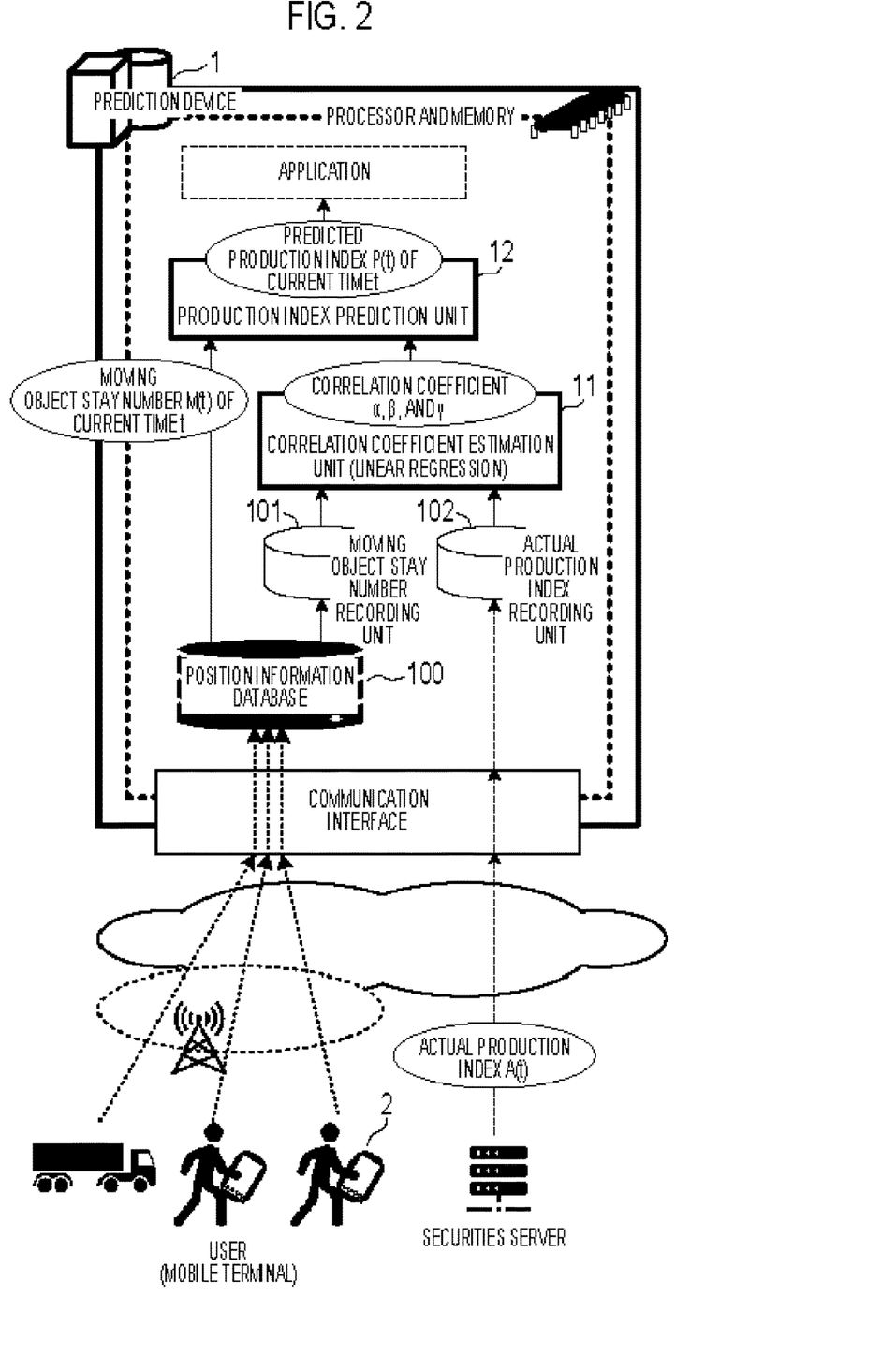
FIG. 2 is a functional configuration diagram of a prediction device according to an embodiment.

FIG. 2 is a functional configuration diagram of a prediction device according to an aspect of the disclosure.

The prediction device 1 predicts the production index. According to FIG. 2, the prediction device 1 has a position information database 100, a moving object stay number recording unit 101, an actual production index recording unit 102, a correlation coefficient estimation unit 11, and a production index prediction unit 12. Above-mentioned functional component parts are constituted with one or more processors, and are realized as a program for allowing a computer mounted on the device to function. Additionally, the processing flow of the functional component parts can be understood as a method of predicting the production index.

Position Information Database 100

The position information database 100 collects and stores position information via a wireless network from a positioning unit (for example, GPS) mounted on at least one of a mobile terminal possessed by a person or a communication terminal installed in a vehicle.

Moving Object Stay Number Recording Unit 101

The moving object stay number recording unit 101 uses the position information database 100 to count and record the "moving object stay number" in a predetermined production area (for example, an industrial zone area) for each predetermined period t. The moving object stay number is aggregated daily by mobile communications carriers, and definitive numerical values are also compiled in a short period of time. At present, although it takes several days to aggregate, it is being shortened with the evolution of calculation speed.

Figure 3:
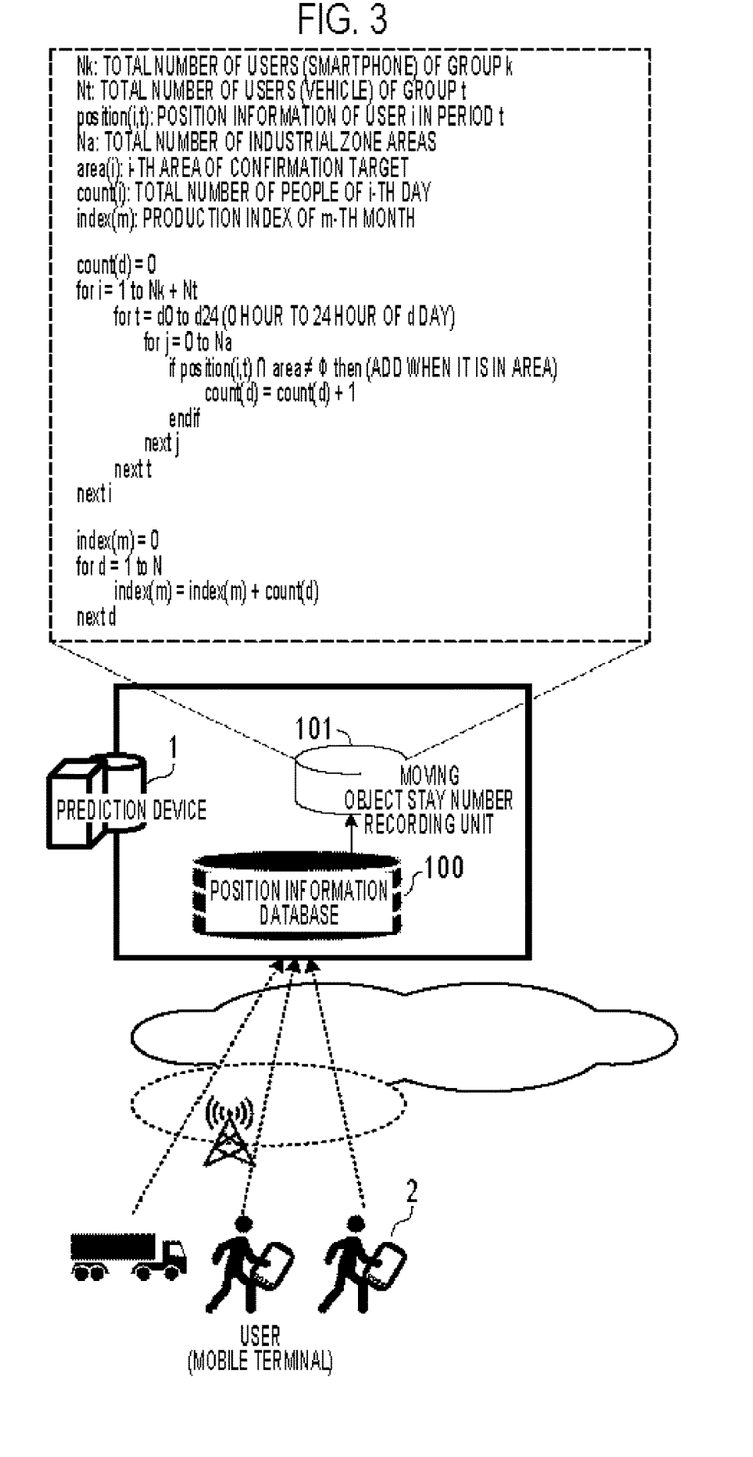
FIG. 3 is an illustration diagram showing an aggregation of a moving object stay number in a moving object stay number recording unit.

FIG. 3 is an illustration diagram showing an aggregation of a moving object stay number in a moving object stay number recording unit.

According to FIG. 3, for all users having unique numbers, the "moving object stay number", which is the number of people and vehicles staying in a specific industrial zone area, is aggregated daily. The actual production index, such as the mining and industrial production index is a monthly aggregate value, but the moving object stay number based on an aspect of the disclosure is aggregated daily (every time zone).

Actual Production Index Recording Unit 102

The actual production index recording unit 102 records an actual production index A(t) for each predetermined period t (for example, one month). Here, the actual production index may be the mining and industrial production index.

The government publishes two types of mining and industrial production indexes, "preliminary figures" and "confirmed figures", every month. The "preliminary figures" is published at the end of the following month, and the "confirmed figures" is published in the middle of the month after following month. Of course, in addition to above-mentioned fact, the annual amendment is published in April of the following year (note that, the degree of attention of investors is low). For example, the preliminary figures for the mining and industrial production index in January is published at the end of February. After that, at the time of calculation of the quick reports, it that are not in time for aggregation, it that are not in time for reporting, and it that are corrected are published as confirmed figures in the middle of March.

Correlation Coefficient Estimation Unit 11

The correlation coefficient estimation unit 11 inputs teacher data that associates a moving object stay number M(t') for a past predetermined period t' with the actual production index A(t') for the same predetermined period t', and estimates the correlation coefficient by training. The correlation coefficient estimation unit 11 may be a machine learning engine based on linear regression.

Figure 4:
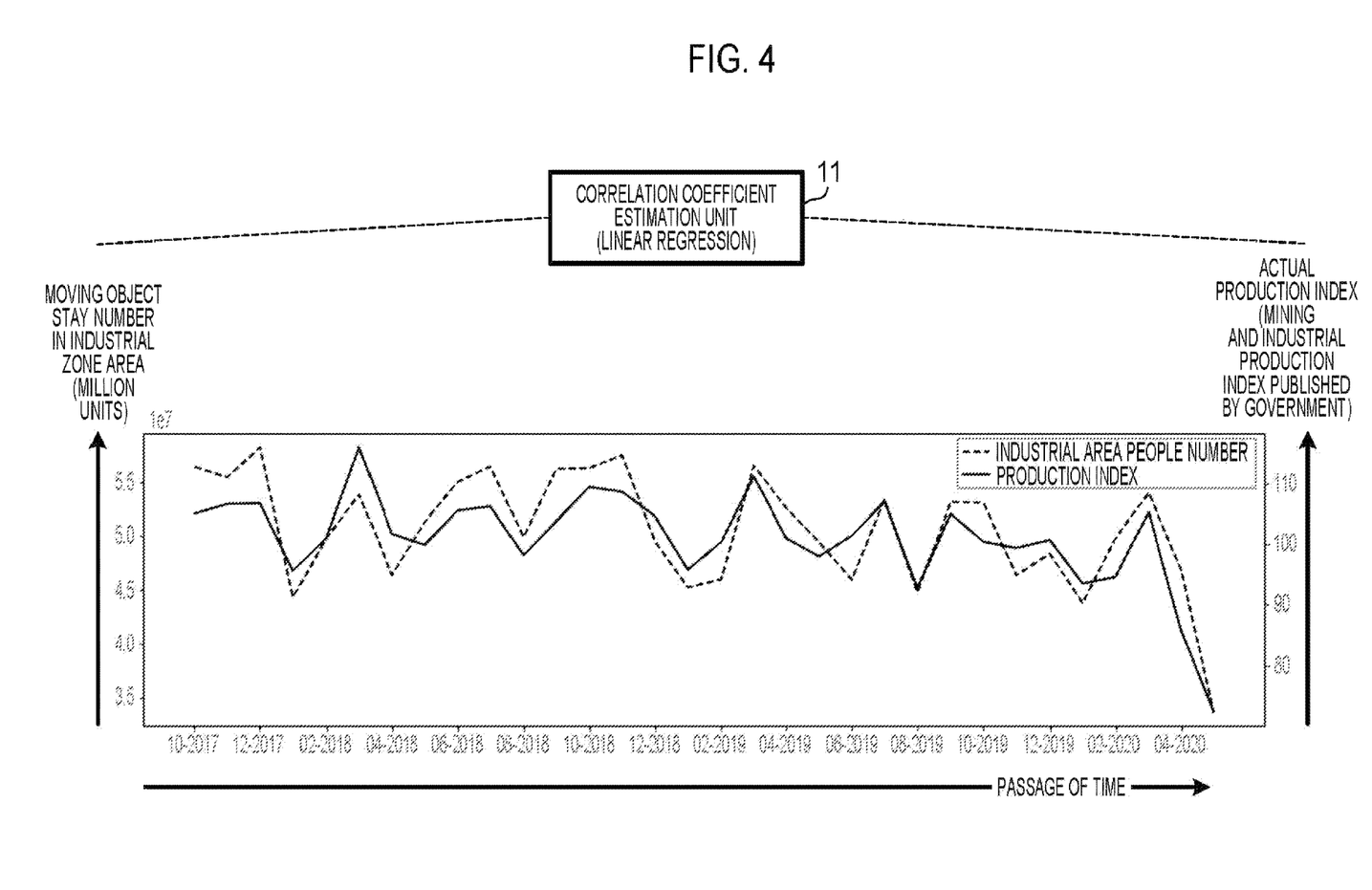
FIG. 4 is a graph showing a correlation between the people number in an industrial zone area and an actual production index according to the passage of time.

FIG. 4 is a graph showing a correlation between the people number and an actual production index in an industrial zone area according to the passage of time. According to FIG. 4, the left vertical axis represents the stay number of the moving object in the industrial zone area, the right vertical axis represents the mining and industrial production index (actual production index), and the horizontal axis represents the passage of time. As is clear from FIG. 4, the mining and industrial production index changes in the same way with the passage of time with respect to the moving object stay number. The "correlation coefficient" is an index that measures the strength of a linear relationship between two random variables. The correlation coefficient takes a real value from −1 to +1. When the correlation coefficient is positive, the two random variables are in direct proportion.

The correlation coefficient estimation unit 11 inputs the following teacher data in the past predetermined period t' (for example, for the past n (>0) months on a monthly basis).

Moving object stay number M(t') for a predetermined period t'

Actual production index A(t') for the same predetermined period t'

The past predetermined period t' represents a certain one month before the current predetermined period t (t'=t-N, . . . , t-1, N is the past period).

Here, since M(t') and A(t') have a very strong correlation, by training with simple linear regression, the correlation coefficients α, β, and γ in the following relational equation can be estimated.

$$A(t')=\alpha*\gamma*M(t')+\beta$$

γ: ratio of correlation coefficient between A(t') and M(t')

The estimated correlation coefficients α and β are output to the production index prediction unit 12.

Production Index Prediction Unit 12

From the moving object stay number M(t) for the target period t, the production index prediction unit 12 calculates the predicted production index P(t) for the same target period t using the correlation coefficients α and β.

$$P(t)=\alpha*\gamma*M(t)+\beta$$

The predicted production index P(t) is, for example, the mining and industrial production index predicted in the period t. As a result, the predicted production index P(t) can be predicted before the actual production index A(t) is published.

Here, the moving object stay number M(t) for the target period t input to the production index prediction unit 12 is the cumulative number M(t, s) of the moving object stay number in the period t retroactive from the predicted time s. Originally, since the equation is based on the predicted time s, it should be the predicted production index P(t, s), but it is omitted because it is complicated for a description.

The actual production index A(t) of the preliminary figures is published merely on a monthly basis, whereas according to the disclosure, the predicted production index P(t) can be predicted from the moving object stay number M(t) in the industrial zone area until the preliminary figures are published. For example, the preliminary figures of the mining and industrial production index (actual production index A(t)) in January will be published at the end of February. On the other hand, according to the disclosure, the predicted production index P(t) can be predicted even in early February, for example. That is, the mining and industrial production index can be known merely by the preliminary figures on a monthly basis according to the related art, whereas according to the disclosure, it can be sequentially predicted from the daily cumulative number of the moving object stay number. Investors can fine-adjust their portfolios from the predicted production index.

Figure 5:
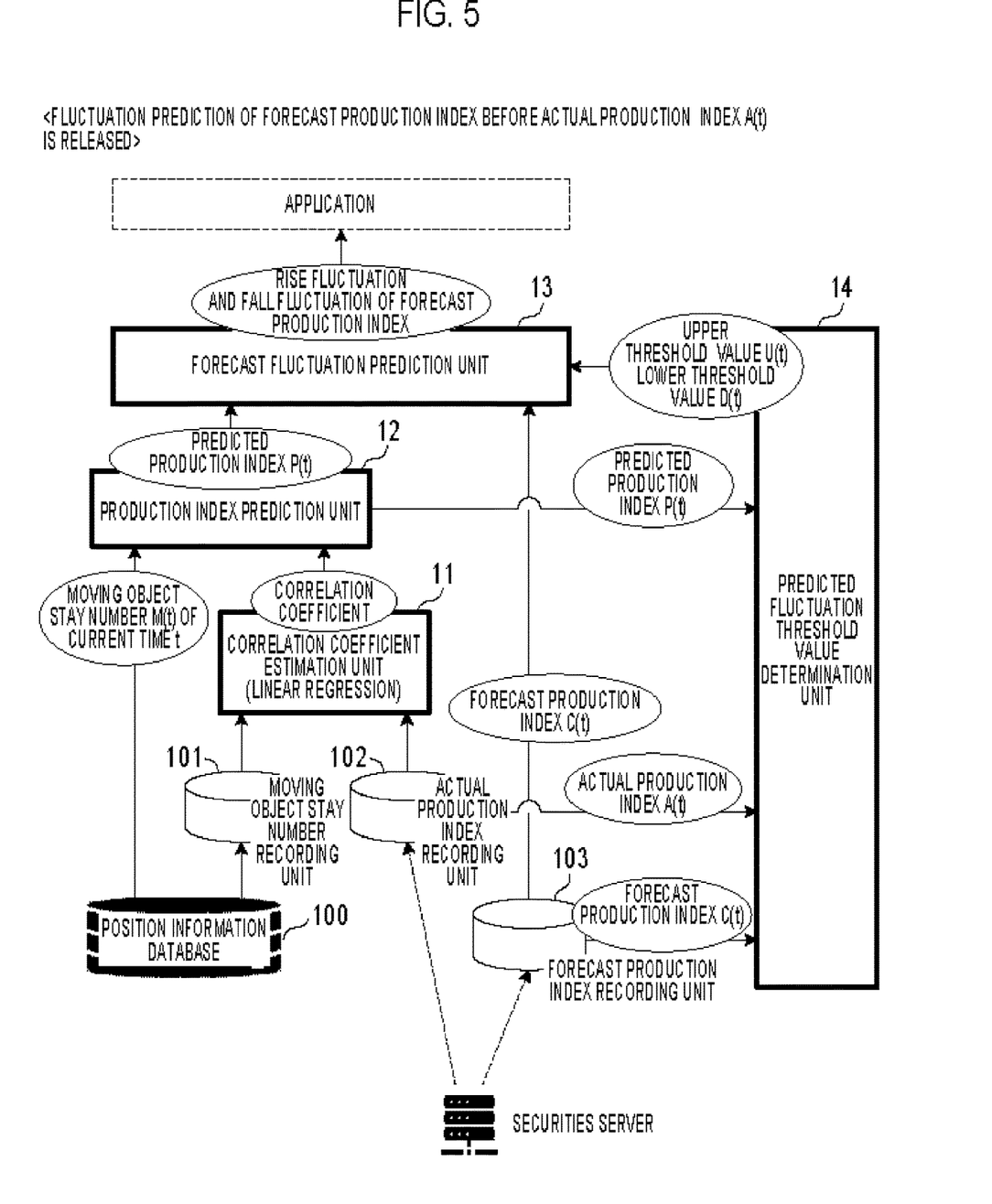
FIG. 5 is a functional configuration diagram that predicts fluctuations of a forecast production index before the actual production index is released.

FIG. 5 is a functional configuration diagram that predicts fluctuations of a forecast production index before the actual production index is released.

According to FIG. 5, as compared with FIG. 2, it further has a forecast production index recording unit 103, a forecast fluctuation prediction unit 13, and a predicted fluctuation threshold value determination unit 14. Above-mentioned functional component parts are also realized as a program for allowing the computer mounted on the device to function. Additionally, the processing flow of the functional component parts can be also understood as a method of predicting fluctuations in the forecast production index.

Forecast Production Index Recording Unit 103

The forecast production index recording unit 103 receives and stores the "forecast production index" that serves as a market consensus from the securities server. Specifically, it is the mining and industrial production index forecasted as a market consensus. The "forecast production index" is an average value (or a weighted average based on the correct answer rate) of economic indicators predicted by a plurality of macroeconomists, and is distributed daily from the securities server. In general, many investors sequentially fine-adjust their portfolios in response to fluctuations in the forecast production index C(t) distributed.

Here, the actual production index A(t) (published actual mining and industrial production index) that is to be the government publication is expected to be a value close to the predicted production index P(t) (mining and industrial production index predicted in FIG. 2). However, when the government publication, there may be a market surprise that the actual production index A(t) and the forecast production index deviate significantly. Accordingly, when there is a large deviation between the predicted production index P(t) that is daily predicted and the forecast production index C(t) that is daily forecasted before the government publication, it can be predicted that there is a high potential that a market surprise will occur.

Forecast Fluctuation Prediction Unit 13

The forecast fluctuation prediction unit 13 predicts the occurrence of a market surprise by the deviation that occurs between the "predicted production index P(t)" that is daily predicted and the "forecast production index C(t)" that is daily forecasted. Specifically, the forecast fluctuation prediction unit 13 compares the predicted production index P(t) for the target period t predicted by the production index prediction unit 12 with the forecast production index C(t) for the target period t forecasted as a market consensus.

The forecast fluctuation prediction unit 13 makes a prediction as follows.

(1) When the predicted production index P(t) is larger than an upper threshold value U(t) with respect to the forecast production index C(t), the rising fluctuation of the forecast production index is predicted. That is, it means that there is a high potential that a market surprise of rising fluctuations will occur.

$$P(t)-C(t)>U(t), U(t)>0$$

(2) When the forecast production index C(t) is larger than a lower threshold value D(t) with respect to the predicted production index P(t), the falling fluctuation of the forecast production index is predicted. In other words, it means that there is a high potential that a market surprise of falling fluctuations will occur.

$$C(t)-P(t)>D(t), D(t)>0$$

Predicted Fluctuation Threshold Value Determination Unit 14

The predicted fluctuation threshold value determination unit 14 determines the upper threshold value U(t) and the lower threshold value D(t) in the forecast fluctuation prediction unit 13. Determination is made retroactively to the past n months.

The predicted fluctuation threshold value determination unit calculates two variances as follows.

(1) A first variance V1 based on the error between the actual production index A(t) and the predicted production index P(t) in the target period t $$V1=1/(n-1)\cdot\Sigma(P(t)-A(t))^2$$

(2) A second variance V2 based on the error between the actual production index A(t) and the forecast production index C(t) for the target period t $$V2=1/(n-1)\cdot\Sigma(C(t)-A(t))^2$$

Then, the upper threshold value U(t) and the lower threshold value D(t) are determined based on the square root ($\sqrt{(V1+V2)}$) of the sum (V1+V2) of the first variance V1 and the second variance V2.

Since the predicted production index P(t) and the forecast production index C(t) are fundamentally different prediction methods, it is assumed that they are independent of each other. According to the disclosure, the variance is not calculated from the direct difference between the predicted production index P(t) and the forecast production index C(t), but is divided into the variances V1 and V2. The reasons are as follows: (a) When the forecast production index C(t) of the market consensus normally deviates from the actual production index A(t) of the government publication, market participants perceive that the forecast production index C(t) naturally deviates and thus assume that market surprises are unlikely to occur. Additionally, (b) it is assumed that it is difficult to supplement the occurrence of market surprises even when the prediction precision based on the disclosure deteriorates.

As another embodiment, the predicted fluctuation threshold value determination unit 14 may determine the upper threshold value U(t) and the lower threshold value D(t) as the same values as follows.

$$U(t)=D(t)=\sigma\times\sqrt{(V1+V2)}$$

where σ: coefficient (1.96 when the coefficient is based on error normal distribution), Of course, a difference may be made between the U(t) and the D(t). The coefficient σ is, for example, 2 or 1.96. When σ=1.96 and the error follows a normal distribution, it can be predicted that there is a high potential that a market surprise will occur with a probability of 2.5% on one side.

Figure 6:
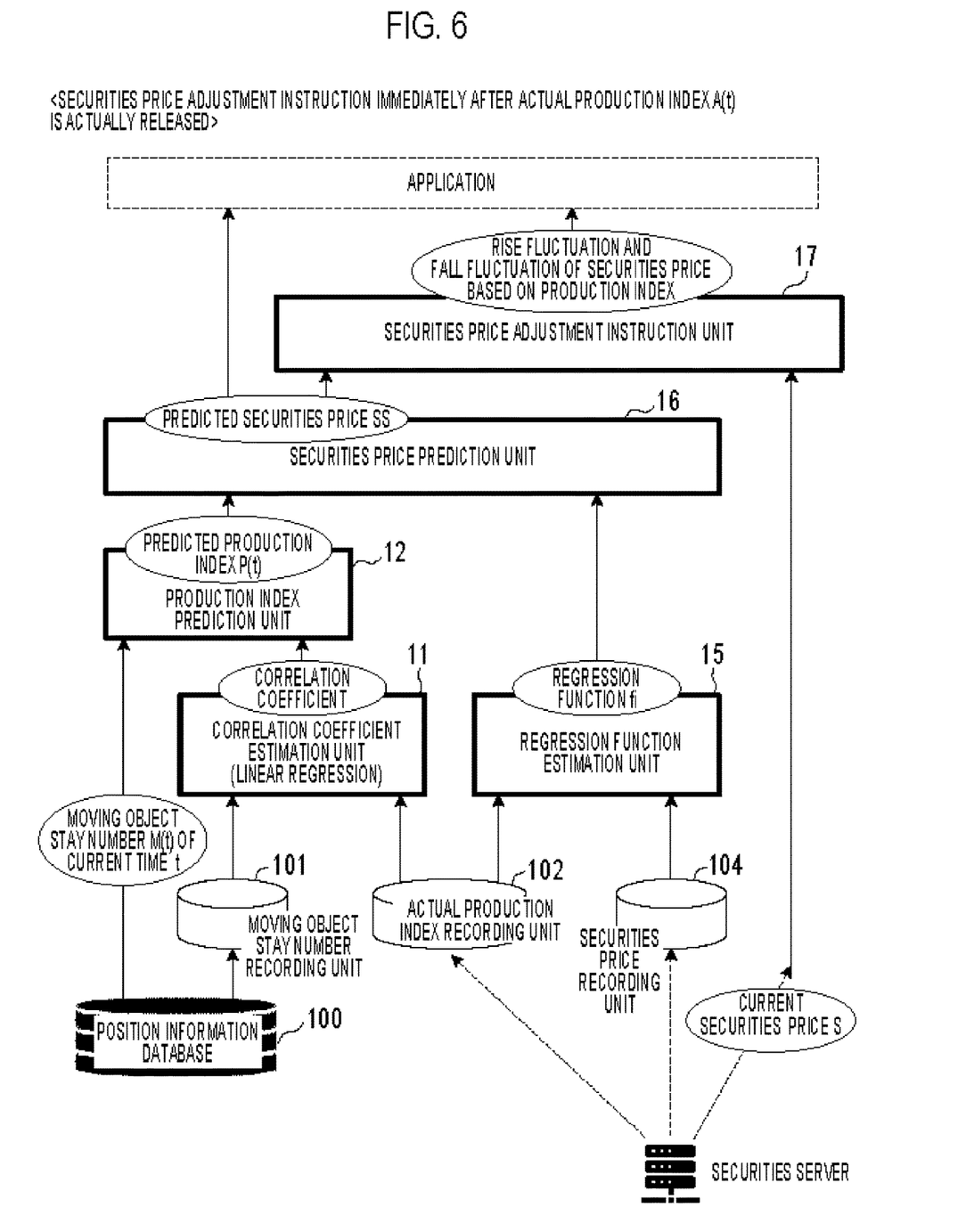
FIG. 6 is a functional configuration diagram that predicts securities price fluctuations immediately after the actual production index is actually released.

FIG. 6 is a functional configuration diagram that predicts securities price fluctuations immediately after the actual production index is actually released.

According to FIG. 6, as compared with FIG. 2, it further has a securities price recording unit 104, a regression function estimation unit 15, a securities price prediction unit 16, and a securities price adjustment instruction unit 17. Above-mentioned functional component parts are also realized as a program for allowing the computer mounted on the device to function. Additionally, the processing flow of the functional component parts can be understood as a securities price adjustment instruction method.

Securities Price Recording Unit 104

The securities price recording unit 104 records a securities price S(i,t) of a financial product i for each predetermined period t. Specifically, the stock price (securities price) of a financial product related to, for example, the mining and industrial production index is received and stored from the securities server.

Regression Function Estimation Unit 15

The regression function estimation unit 15 inputs the teacher data that associates the actual production index A(t) for the predetermined period t in the actual production index recording unit 102 with the securities price S(i,t) for the same predetermined period t in the securities price recording unit 104 and estimates a regression function fi by training.

$$S(i,t)=fi(A(t))+\varepsilon$$

ε: error

The estimated regression function fi is output to the securities price prediction unit 16.

Here, a correlation coefficient ρ between the actual production index A(t) and the securities price S(i,t) is expressed as follows.

$$\rho(S(i,t), A(t))$$

The higher absolute value abs(ρ(S(i,t), A(t))) of the correlation coefficient a financial product has, the higher relationship the financial product has with the mining and industrial production index, and the more the financial product follows the regression function fi described above.

Securities Price Prediction Unit 16

The securities price prediction unit 16 calculates a predicted securities price SS(t) for a target period t from the predicted production index P(t) for the target period t using the regression function fi.

$$SS(t)=fi(P(t))$$

The predicted securities price SS(t) is based on the predicted production index P(t) predicted from the moving object stay number in the industrial zone area. That is, it can be said that the predicted securities price SS is the securities price predicted from the moving object stay number in the industrial zone area.

Securities Price Adjustment Instruction Unit 17

The securities price adjustment instruction unit 17 instructs the difference between the predicted securities price SS(t) and the actual securities price S(t) as an adjustment for the rise or fall in the actual securities price S(t). In general, immediately after the actual production index A(t) is actually released, adjustments based on the rise or fall of the actual securities price S(t) related to the actual production index A(t) occur. Therefore, the difference between the predicted securities price SS(t) and the actual securities price S(t) are to be adjusted immediately after the actual production index A(t) is actually released, and it is possible to instruct investors to do so. The difference between the predicted securities price SS(t) and the actual securities price S(t) is a predictable adjustment amount for investors and can be regarded as a profit opportunity. The higher the potential for market surprises, the greater the profit opportunities.

The securities price adjustment instruction unit 17 predicts as follows.

(1) When the predicted securities price SS(t) is larger than the actual securities price S(t) by a predetermined threshold value or more, it can be instructed that there is a high potential that a market surprise of the rise in the securities price will occur.

$$SS(i,t) \gg S(i,t)$$

(2) When the predicted securities price SS(t) is smaller than the actual securities price S(i) by a predetermined threshold value or more, it can be instructed that there is a high potential that a market surprise of the fall in the securities price will occur.

$$SS(i,t) \ll S(i,t)$$

The stock price is expected to fall due to adjustments immediately after the market surprise.

As an investor, he or she can adjust the products incorporated in his or her investment portfolio according to the output result of the forecast fluctuation prediction unit 13 of FIG. 5 and the output result of the securities price adjustment instruction unit 17 of FIG. 6. In particular, for example, products related to the production index based on the mining and industrial production index can be reviewed. Of course, even for products that are not included in the investment portfolio, it is possible to invest merely when there is a high potential for market surprises, depending on the relationship with the production index. However, care should be taken to ensure that analysts who have contracted for the services of the disclosure do not have incentives to cause market surprises.

As described above in detail, the prediction device, the medium, and the method of an aspect of the disclosure allow the production index to be predicted by using the moving object stay number. As a result, the potential for market surprise occurrence can be predicted.

According to the disclosure, it is possible to predict a highly reliable production index by applying big data of the moving object stay number in an area zone to the market consensus that is merely a "market feeling" among analysts. Additionally, it is also possible to predict in advance the potential of market surprises in which the market fluctuates significantly, and in particular, it is also possible to allow investors and market participants to perform preparation and investment to get ready for the market surprises.

Further, as a result, for example, due to the fact that "the production index can be predicted using the moving object stay number", it is possible to contribute to the United Nations-led sustainable development goals 8 (SDGs), that is "promoting inclusive and sustainable economic growth, employment, and decent work for all".

Various changes, modifications, and omissions of the various embodiments of the disclosure mentioned above can be easily made by those skilled in the art within the scope of the technical idea and viewpoint of the disclosure. The above description is just an example and does not attempt to limit anything. The disclosure is limited merely to the scope of claims and their equivalents.

What is claimed is:

1. A prediction device that predicts a production index, the prediction device comprising one or more processors configured to
    collect position information of moving objects via a wireless network from a positioning unit mounted on at least one of a mobile terminal possessed by an individual or a communication terminal installed in a vehicle, and store the position information in a position information database,
    calculate the number of moving objects based on the position information of the moving objects stored in the position information database,
    record the number of moving objects staying in a predetermined production area for every predetermined period,
    record an actual production index for each predetermined period,
    estimate a correlation coefficient by applying linear regression on training data that associates the number of moving objects staying in the predetermined production area with the actual production index for the predetermined period,
    calculate a predicted production index for a target period based on a number of moving objects staying for the target period, using the correlation coefficient,
    wherein:
    the one or more processors are further configured to compare the predicted production index predicted for the target period with a forecast production index market-forecasted for the target period; and
    the one or more processors are configured to more accurately calculate a deviation between the forecast production index market-forecasted, and the predicted production index by:
    predicting a rising fluctuation of the forecast production index when the predicted production index is larger than the forecast production index by a first value which is more than an upper threshold value,
    predicting a falling fluctuation of the forecast production index when the forecast production index is larger than the predicted production index by a second value which is more than a lower threshold value, and
    automatically executing trades to adjust an investment portfolio based on the predicted rising or falling fluctuation.

2. The prediction device according to claim 1, wherein the production index is a mining and industrial production index, and the predetermined production area is a mining and industrial zone area.

3. The prediction device according to claim 1, wherein:
    the one or more processors are configured to determine the upper threshold value and the lower threshold value; and
    the one or more processors are configured to
    calculate a first variance based on an error between the actual production index and the predicted production index for the target period, $$V1 = 1/(n-1) \cdot \Sigma(P(t) - A(t))^2$$

where V1 is the first variance, A(t) is the actual production index, and P(t) is the predicted production index, calculate a second variance based on an error between the actual production index and the forecast production index for the target period, $$V2 = 1/(n-1) \cdot \Sigma(C(t) - A(t))^2 \quad \quad 5$$

where V2 is the second variance, C(t) is the forecast production index, and A(t) is the actual production index, and determine the upper threshold value and the lower threshold value based on a square root ($\sqrt{(V1+V2)}$) in a sum of the first variance and the second variance.

4. The prediction device according to claim 3, wherein the one or more processors are configured to determine the upper threshold value and the lower threshold value as the same value as follows $$U(t) = D(t) = \sigma \times \sqrt{(V1+V2)}$$

where σ: coefficient (1.96 when the coefficient is based on error normal distribution), U(t) is the upper threshold value, and D(t) is the lower threshold value.

5. The prediction device according to claim 1, wherein:
the one or more processors are further configured to
record a securities price of a financial product for every predetermined period,
estimate a regression function by using training data that associates the actual production index for the predetermined period with the securities price for the predetermined period and, $$S(i,t) = fi(A(t)) + \varepsilon$$

where S(i,t) is the securities price, fi is the regression function, A(t) is the actual production index, and ε is an error, calculate a predicted securities price for a target period from a predicted production index for the target period using the regression function, $$SS = fi(P(t))$$

where SS is the predicted securities price, fi is the regression function, and P(t) is the predicted production index, and instruct a difference between the predicted securities price and an actual securities price as an adjustment for a rise or a fall in the actual securities price; and
the one or more processors are configured to
predict that a securities price rises when the predicted securities price is larger than the securities price based on the actual production index by a first predetermined threshold value or more, and
predict that a securities price falls when the predicted securities price is smaller than the securities price based on the actual production index by a second predetermined threshold value or more.

6. A non-transitory storage medium storing instructions that cause a computer installed in a device that predicts a production index to perform functions, the non-transitory storage medium comprising:
collecting position information of moving objects via a wireless network from a positioning unit mounted on at least one of a mobile terminal possessed by an individual or a communication terminal installed in a vehicle, and store the position information in a position information database;
calculating the number of moving objects based on the position information of the moving objects stored in the position information database;
recording the number of moving objects staying in a predetermined production area for every predetermined period;
recording an actual production index for each predetermined period;
estimating a correlation coefficient by applying linear regression on training data that associates the number of moving objects staying in the predetermined production area with the actual production index for the predetermined period;
calculating a predicted production index for a target period based on a number of moving objects staying for the target period, using the correlation coefficient;
comparing the predicted production index predicted for the target period with a forecast production index market-forecasted for the target period; and
more accurately calculating a deviation between the forecast production index market-forecasted, and the predicted production index by:
predicting a rising fluctuation of the forecast production index when the predicted production index is larger than the forecast production index by a first value which is more than an upper threshold value,
predicting a falling fluctuation of the forecast production index when the forecast production index is larger than the predicted production index by a second value which is more than a lower threshold value and
automatically executing trades to adjust an investment portfolio based on the predicted rising or falling fluctuation.

7. A method of predicting a production index of a device, the device being configured to record a number of moving objects staying in a predetermined production area for every predetermined period and record an actual production index for each predetermined period, the method comprising:
collecting position information of moving objects via a wireless network from a positioning unit mounted on at least one of a mobile terminal possessed by an individual or a communication terminal installed in a vehicle, and store the position information in a position information database;
calculating the number of moving objects based on the position information of the moving objects stored in the position information database;
estimating a correlation coefficient by applying linear regression on training data that associates the number of moving objects staying in the predetermined production area with the actual production index for the predetermined period;
calculating a predicted production index for a target period based on a number of moving objects staying for the target period, using the correlation coefficient;
comparing the predicted production index predicted for the target period with a forecast production index market-forecasted for the target period;
more accurately calculating a deviation between the forecast production index market-forecasted, and the predicted production index by:
predicting a rising fluctuation of the forecast production index when the predicted production index is larger than the forecast production index by a first value which is more than an upper threshold value,
predicting a falling fluctuation of the forecast production index when the forecast production index is larger than the predicted production index by a second value which is more than a lower threshold value and automatically executing trades to adjust an investment portfolio based on the predicted rising or falling fluctuation.

\* \* \* \* \*